Patented Apr. 26, 1932

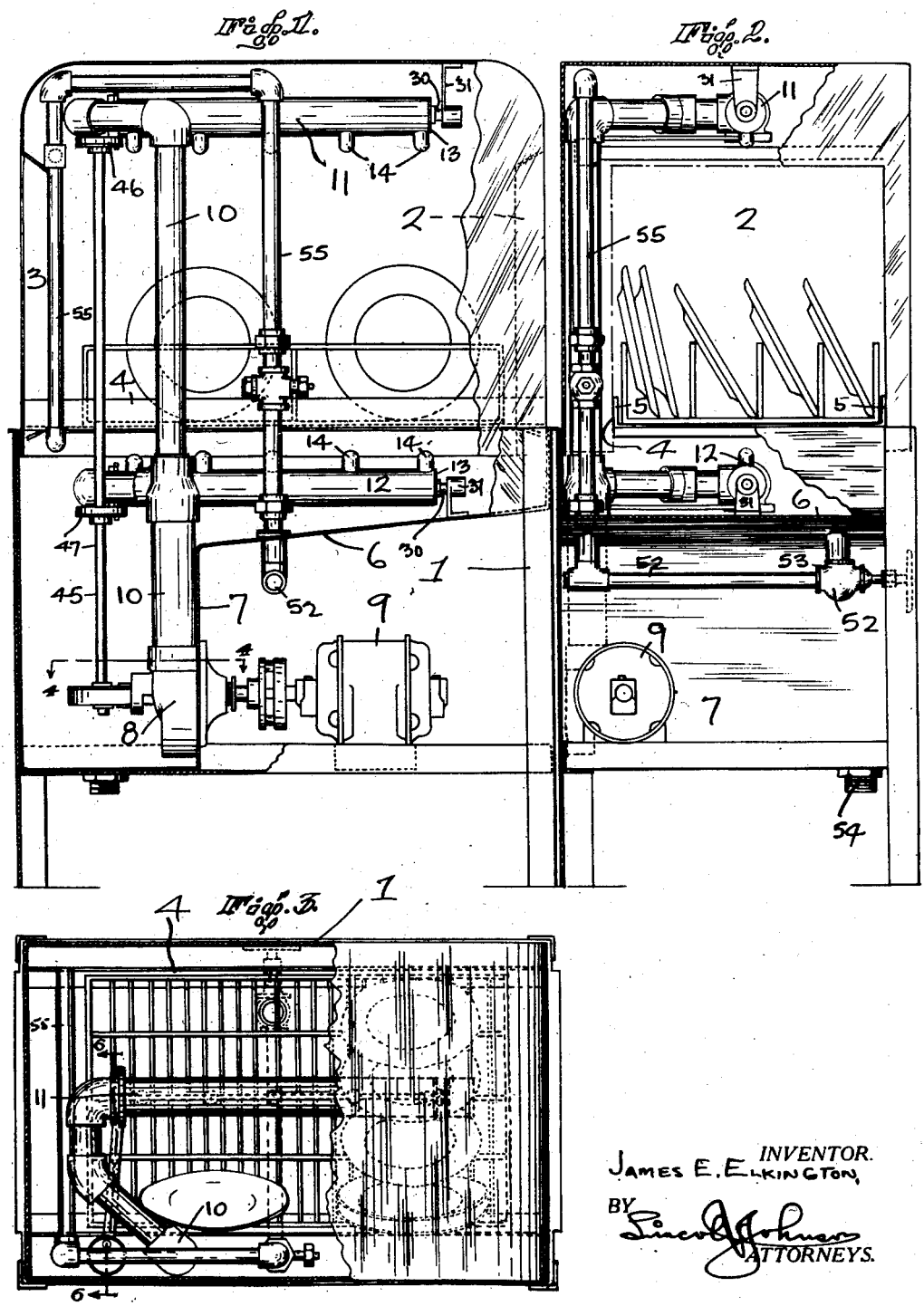

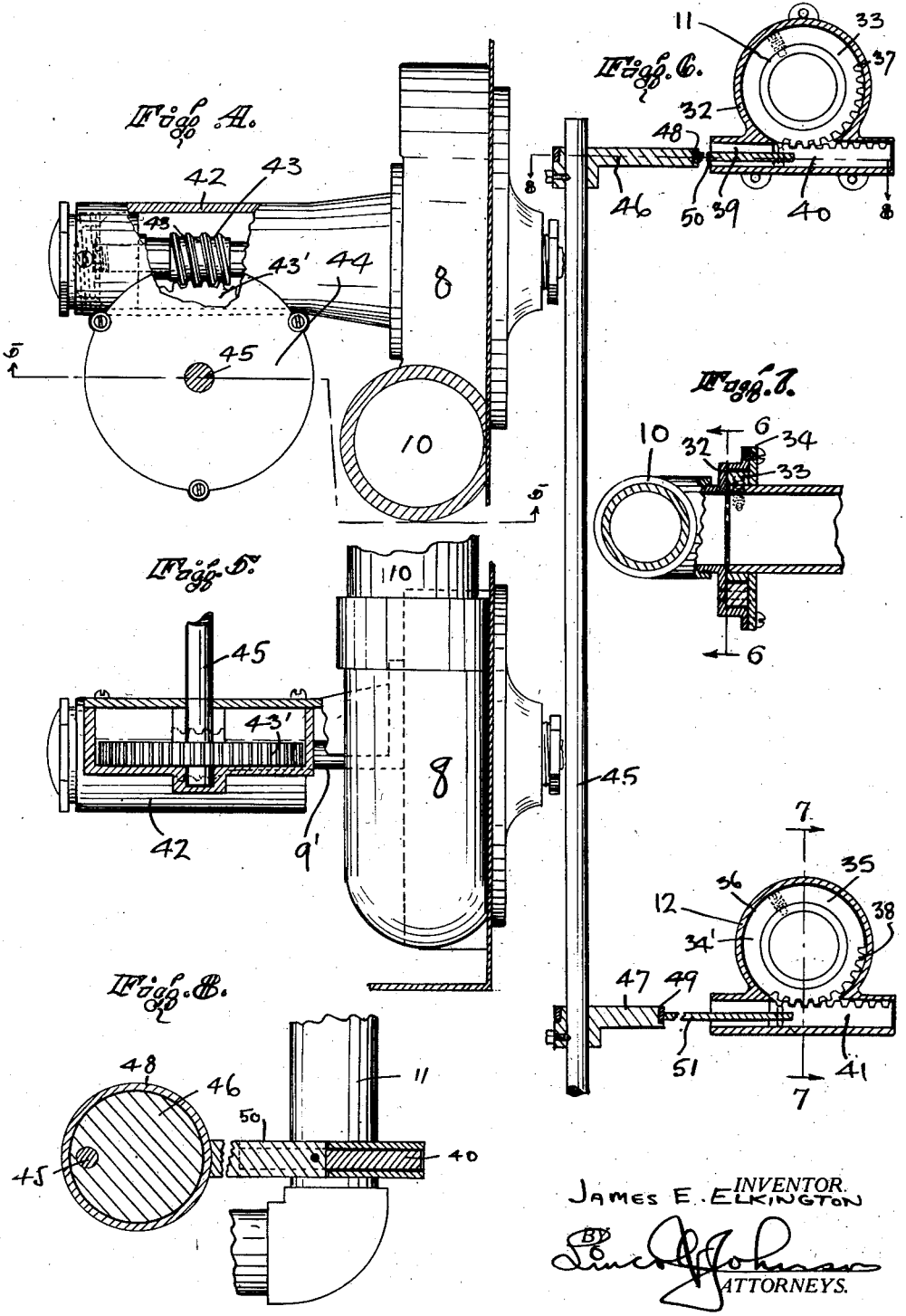

1,855,344

UNITED STATES PATENT OFFICE

JAMES E. ELKINGTON, OF SAN FRANCISCO, CALIFORNIA

DISHWASHING MACHINE

Application filed August 8, 1928. Serial No. 298,353.

This invention relates particularly to an apparatus in which dishes and other articles may be cleansed by spraying fluid under pressure thereon.

An object of the invention is to provide a dish washing machine having a fluid spraying device therein that is oscillated back and forth mechanically to spray fluid onto the dishes; and a sprayer in which the maximum volume of fluid delivered from the pump is directed onto the articles to be cleansed.

A further object of the invention is to provide a fluid spraying device for a dish washing machine that consists of a pair of pipes having radially extended nozzles thereon, rotatably mounted within the casing above and below the dishes to be washed, each of said pipes being oscillated mechanically back and forth to spray fluid under pressure onto the dishes.

A further object of the invention is to provide a dish washing machine provided with a pair of spray pipes to spray the fluid onto the dishes to be cleansed, said spray pipes being in communication with a pump, and to provide means driven by the pump in the form of a pair of eccentrics to oscillate the spray pipes back and forth to discharge the cleansing fluid onto the dishes.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings:

Fig. 1 is a vertical section taken through a dish washing machine constructed in accordance with my invention, the said machine being shown in section to illustrate the interior construction thereof.

Fig. 2 is an end elevation partly in section, taken at right angles to the view shown in Fig. 1.

Fig. 3 is a plan view partly in section of Fig. 1.

Fig. 4 is an enlarged view of the fluid pump and spray pipe oscillating mechanism taken on the line 4—4 of Fig. 1.

Fig. 5 is a section taken through Fig. 4 on the line 5—5.

Fig. 6 is an enlarged detail of the spray pipe oscillating means taken on the line 6—6 of Figs. 3 and 7.

Fig. 7 is a section taken through Fig. 6 on the line 7—7.

Fig. 8 is a section taken through Fig. 6 on the line 8—8.

In the conventional type of dish washing machine, the cleansing process is accomplished by spraying fluid under pressure upon the articles to be cleaned from a rotary spraying device. A rotary spraying device is utilized for the reason that by it the position or direction of the stream of spraying fluid to strike the articles to be cleansed is varied from all angles and hence dislodges any material that may have adhered to the articles to be cleaned.

In my invention to be described herein, I do not use a rotary spraying device but instead use spraying elements that oscillate back and forth over the dishes to be cleansed, to vary the directional application and force of the fluid for cleansing the dishes and the oscillating movement is positively applied to the said spray pipes so that each spray pipe will move back and forth within a predetermined arc.

In detail, the construction illustrated in the drawings comprises a frame 1, entirely closed on its top, bottom and sides, but having openings 2 and 3 through its opposite ends, to permit the passage of a dish carrying rack therethrough. A guideway 4 is provided transversely across the casing 1, in alignment with the ports 2 and 3, to insure that the dish carrying rack will have a direct passage through the machine. Angle bars 5 or some other type of conveying means, are provided on the guideway 4 to permit the free passage of the dish carrying rack through the machine. In the bottom 6 of the casing 1, I provide a tank or reservoir 7 which is adapted to hold fluid capable of effecting the cleansing of the articles to be cleaned, when such fluid is directed into contact with the said articles. A rotary pump 8 is provided in the tank 7, and a motor 9 situated outside of the tank is connected to the pump to rotate it. The pump is connected by a supply pipe 10 to a sprayer pipe 11 located adjacent the top of the housing 1, above the articles to be cleansed and to a sprayer pipe 12 located adjacent the bottom of the housing 1, beneath the articles to be cleansed.

The sprayer pipes 11 and 12 are duplicates one of the other, and each consists of a length of hollow pipe connected at one end to the fluid supply conduit 10, and closed at the other end by a suitable pipe cap 13. One end of each sprayer pipe 11 and 12, is rotatably connected to the supply pipe 10, while the cap on the opposite end of each sprayer pipe has a shaft 30 thereon journaled in a fixed bearing 31 located within the casing 1. Each sprayer pipe is provided with a plurality of discharge nozzles 14 therein arranged in spaced and aligned relation along one side of the pipe throughout the entire length thereof. In the upper sprayer pipe, the nozzles 14 face down onto the articles to be cleaned, while in the lower spray pipe the nozzles 14 face up toward the articles to be cleaned.

The supply pipe 10 at the point where it connects with the upper spray pipe 11 is provided with an annular recess 32 therein, within which a shoulder 33 provided on the pipe 11 is adapted to be received. A ring plate 34 is secured against the face of the shoulder 32 to hold the pipe annulus 33 confined therein. This arrangement permits the spray pipe to be rotatably or oscillatably confined in relation to the fluid supply pipe. The lower spray pipe 12 is provided with an annulus 35 therein that is confined within an annular socket 36 formed on the supply pipe 10, and a ring plate 34' is secured onto the socket 36 to hold the oscillatable spray pipe in position thereon. As heretofore described, the opposite ends of the spray pipes 11 and 12 are rotatably journaled in relation to bearings 31 located within the casing. A gear segment 37 is cut around a portion of the periphery of the pipe annulus 33 and a similar segment 38 is cut around a portion of the periphery of the lower annulus 35. One side of the housing 32 and 36 is provided with a guideway 39 therein arranged tangentially to the periphery of each of the annuluses 33 and 35. A gear rack 40 is slidably mounted within the guideway 39 in the upper housing, and a rack 41 in the guideway in the lower housing. Each of the racks 40 and 41 are adapted to reciprocate back and forth in meshing engagement with the respective annuluses and to oscillate each of the sprayer tubes throughout a limited arc.

A shaft 9' of the pump 8 extends out into a housing 42 formed on the side of the pump within the tank 7. The housing 42 is provided with bearings at opposite ends thereof and a worm 43 is mounted on the shaft 9', being journaled on the bearing within the housing 42. A worm wheel 43' meshes with the worm 43, said worm being rotatably confined within the housing 44 formed on one side of the housing 42. A shaft 45 extends upwardly in substantially a vertical position from the worm wheel 43', and said shaft has a pair of eccentrics 46 and 47 arranged thereon at points substantially opposite the respective spray tubes 11 and 12. Each of the eccentrics 46 and 47 are shouldered to receive the respective annular bands 48 and 49. A link or rod 50 is connected to the band 48 and to the upper gear rack 40, and a similar link or bar 51 connects the lower band 49 with the lower gear rack 41. Thus, as the shaft 45 rotates, both of the eccentrics 46 and 47 rotate therewith within the bands 48 and 49, and thus cause the respective gear racks 40 and 41 to be reciprocated in and out and to partially rotate or oscillate the spray tubes 11 and 12. The length of the gear racks 40 and 41 regulates the amount of oscillation or back and forth movement that each of the spray tubes 11 and 12 will have. The reservoir or tank 7 receives its water supply from a pipe 52 on which a control valve 53 is placed to insure that the proper amount of water will be admitted into said tank. A discharge outlet 54 is provided in the bottom of the tank. A pipe 55 connects with the supply line 52 for the purpose of conducting rinsing water to a point adjacent the outlet port in the casing where the dishes may be finally rinsed before delivery.

Before operating the machine for washing, the dishes or articles to be cleaned are placed on trays and the trays moved into the interior of the sprayer housing. The pump 8 is then started in operation, to force the liquid into each of the sprayer housings and outwardly through the discharge nozzles in the rotatable casings. The sprayer casings will start rotating as soon as the fluid from the pump is discharged therefrom. The fluid is sprayed from the nozzles in constantly shifting streams upon the dishes to be cleaned. The fluid is also delivered under a pressure that is sufficient to cleanse all waste material from the dishes but insufficient to throw the dishes from the racks and to cause breakage thereof.

Having thus described this invention, what I now claim and desire to secure by Letters Patent is:

1. A dish washing machine comprising a receptacle; means to hold dishes in the receptacle; separate sprayer pipes mounted to oscillate on their own axes above and below the dishes to be sprayed, each sprayer pipe having a plurality of nozzles therein along the side thereof facing the dishes to be sprayed; means to supply fluid under pressure to said sprayer pipes; a motor; eccentric means operatively connected to the motor; toothed racks operatively connected to and reciprocated by the respective eccentric means; and means to operatively connect each rack to the respective pipe periphery for oscillation of the sprayer pipes.

2. A dish washing machine comprising a receptacle; means to hold dishes in the re-receptacle; a sprayer pipe mounted to oscillate on its own axis contiguous to the dishes to be sprayed, said pipe having a plurality of separate discharge ports along the side thereof facing the dishes to be sprayed; means to supply fluid under pressure to said sprayer pipes; a motor; a worm wheel driven by the motor; a shaft connected to and driven by said wheel; an eccentric on the shaft; a toothed rack operatively connected to and reciprocated by the eccentric; and a toothed pipe segment engaging said rack to be oscillated by the reciprocation of said rack, and being connected to the sprayer pipe to oscillate it.

3. In a dish washing machine; a rack to hold articles to be cleansed; sprayer pipes arranged above and below the articles to be cleansed, each sprayer pipe being oscillatable on its own axis through a limited arc; means to supply fluid under pressure to each sprayer pipe; a toothed segment on each sprayer pipe; a toothed rack engaging each pipe segment to oscillate the same; and eccentric means operatively connected to each rack to simultaneously reciprocate each rack and thereby to oscillate each sprayer pipe.

In testimony whereof, I have hereunto set my hand at San Francisco, California, this 2nd day of June, 1928.

JAMES E. ELKINGTON.